US008258974B2

(12) United States Patent
Bell, Sr.

(10) Patent No.: US 8,258,974 B2
(45) Date of Patent: Sep. 4, 2012

(54) CASINO TIME CONTROL UNIT

(76) Inventor: Edmond Bell, Sr., Inglewood, CA (US)

( * ) Notice: Subject to any disclaimer, the term of this patent is extended or adjusted under 35 U.S.C. 154(b) by 429 days.

(21) Appl. No.: 12/427,765

(22) Filed: Apr. 22, 2009

(65) Prior Publication Data
US 2010/0271230 A1  Oct. 28, 2010

(51) Int. Cl.
*G08B 5/00* (2006.01)
(52) U.S. Cl. .......... 340/815.4; 463/25; 463/29; 463/42
(58) Field of Classification Search ............... 340/815.4; 463/25, 29, 42
See application file for complete search history.

(56) References Cited

U.S. PATENT DOCUMENTS

| | | | | |
|---|---|---|---|---|
| 2002/0163422 A1* | 11/2002 | Eggers | | 340/7.29 |
| 2008/0103915 A1* | 5/2008 | Maruszak | | 705/26 |
| 2008/0119276 A1* | 5/2008 | Alderucci | | 463/42 |
| 2008/0217855 A1* | 9/2008 | Sloan | | 273/292 |
| 2009/0011819 A9* | 1/2009 | Huard et al. | | 463/25 |
| 2009/0253498 A1* | 10/2009 | Wolf et al. | | 463/29 |

* cited by examiner

*Primary Examiner* — George Bugg
*Assistant Examiner* — Ojiako Nwugo
(74) *Attorney, Agent, or Firm* — Ash Tankha; Lipton, Weinberger & Husick

(57) ABSTRACT

Disclosed herein is a method and system for signaling requests for services at a facility, for example, a gaming table in a casino. A control device is provided on the gaming table. The control device comprises multiple switches associated with one or more indicators. Each of the services is assigned to one or more of the indicators. A dealer or a player at the gaming table activates the switches for turning on the indicators based on service requirements of the dealer or the player at the gaming table. The turned on indicators signal the requests for the services. The method and system disclosed herein increases the speed of services, increases the income of each gaming table in the casino, enables determination of performance of employees of the casino attending to the requests for the services, and enables real time allocation of resources to different sections of the casino.

19 Claims, 7 Drawing Sheets

CASINO TIME CONTROL UNIT

BACKGROUND

The method and system disclosed herein, in general, relates to signaling requests by a player or a dealer for services at a facility, for example, a casino. More particularly, the method and system disclosed herein relates to signaling requests for services by a player or a dealer at a gaming table in a casino, determining performance of employees of the casino, and allocating resources, for example, allocating employees in a casino in response to signals for requests for services at a gaming table in the casino in real time.

In a typical casino, a game dealer and players sit around a gaming table. The games, for example, blackjack or poker, typically last a few hours during which the players request services for food, drinks, etc. Every time such a need arises, the players notify the dealer of their request. The dealer has to physically locate the appropriate employee of the casino who provides the requested service and notify them of the players' requests. Also, when the dealer requires additional chips to be brought to the table, the dealer has to place the game on hold and turn his attention away from the gaming action at the gaming table to obtain the chips.

A dealer needs to provide his undivided attention to the game at the table in order to ensure fair play and prevent player fraud. The casino also requires the dealer to deal a specific minimum number of hands per hour. The income generated at a table for the casino is proportionate to the number of hands dealt per hour. A decrease in the pace of the game at the gaming table is related to a drop in the money earned by the table for the casino. The dealer discourages anything that is conventionally unnecessary for the conduct of a game at the gaming table. However, food and drink requests by players are generally acceded to by the dealer and the game is interrupted if necessary to service such requests of the players.

Moreover, there is a need to monitor and determine the performance of employees of the casino. The quicker the service provided to the players, the higher is the income of each of the services, and consequently, the income of the casino.

Hence, there is a need for a method and system that enables a player or a dealer to signal requests for one or more services at the gaming table in the casino. Moreover, there is a need for attending to the requirements of the players and dealers in the casino in a quick and efficient manner, without compromising the smooth and fraud-free conduct of the games at the gaming tables. Furthermore, there is a need for a method and system that determines the performance of the employees of the casino. Furthermore, there is a need to reassign or reallocate employees from one section of the casino to another section of the casino depending on player or dealer requests from a certain section of the casino.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated needs for signaling requests for services, for example, food requests, drink requests, security requests, chip requests, requests for presence of a floor manager, etc. by a dealer or a player at a gaming table in a casino and for attending to the requirements of the players and dealers in the casino in a quick and efficient manner, without compromising the smooth and fraud-free conduct of the games at the gaming tables.

A control device is provided on each of the gaming tables in the casino. The control device comprises an access module, for example, a set of locks or a card reader, for authorizing access to the control device. The dealer or a floor manager accesses the control device using access devices, for example, keys or authorization cards which are checked for authorization by the access module. The control device comprises multiple switches, for example, push buttons, associated with one or more indicators, for example, light emitting diodes, conventional lamps, etc. The switches are, for example, dealer-specific switches, player-specific switches, or a combination thereof. The indicators are distinguished by, for example, different colors or different alphanumeric characters. Each of the services is assigned to different indicators. The indicators are housed in a display device provided on each of the gaming tables in the casino. When the dealer or a player wishes to signal a request, the dealer or the player activates the switches for turning on the indicators based on service requirements of the dealer or the player. The turned on indicators signal the requests for the services. A power source, for example, an electric outlet, is used to drive the control device and the indicators. Activation of the indicators signals the requests for the services.

The computer implemented method and system disclosed herein enables the determination of the performance of employees of the casino attending to dealer or player requests for services. The employees of the casino identify requests for the services from the turned on indicators. Parameters associated with response of the employees to the identified requests are measured, recorded, and analyzed. For example, the time taken by the employees to attend to the requests for services is measured using the control device to determine the performance of the employees providing those services. In an embodiment, the number of requests attended to by an employee is also monitored using the control device to determine the performance.

The computer implemented method and system disclosed herein enables allocation of resources, for example, allocation of employees in a casino in response to one or more signals for requests for one or more services at the gaming table in the casino in real time. The computer implemented method and system disclosed herein enables the dealer to activate a player timing device on the control device by activating one of the switches, for measuring a preset elapsed time at the expiration of which one of the indicators is turned on to inform the player to continue playing a game at the gaming table or to withdraw from the game. The player timing device will automatically turn off when the elapsed time reaches the preset time. The preset time is the maximum time allowed for the player to participate in or to "fold" and discontinue playing the rest of the game. Providing the preset time saves time for the dealer and allows the dealer to deal more hands at the gaming table, thereby increasing the income at the gaming table in the casino in a shorter period of time.

The method and system disclosed herein therefore increases the speed of services and increases the income of each gaming table in the casino.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
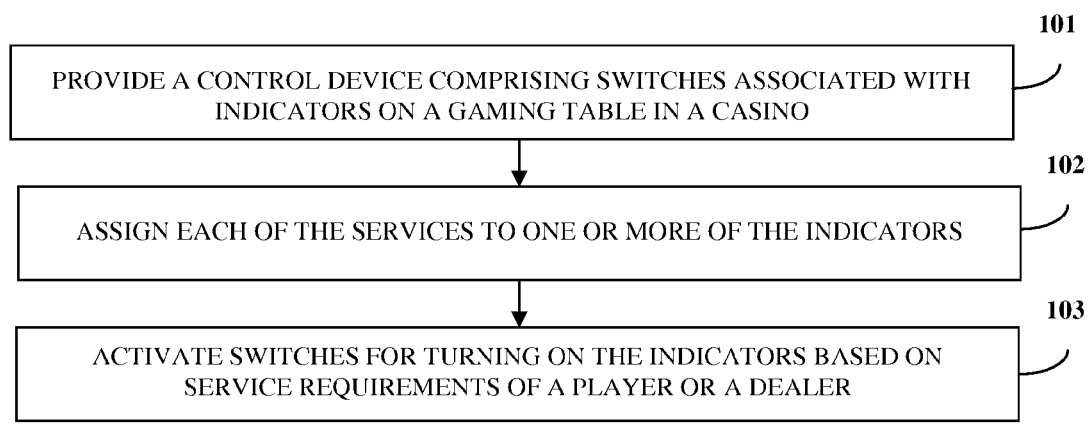
FIG. 1 illustrates a method of signaling requests for one or more services at a gaming table in a casino.
Figure 2A:
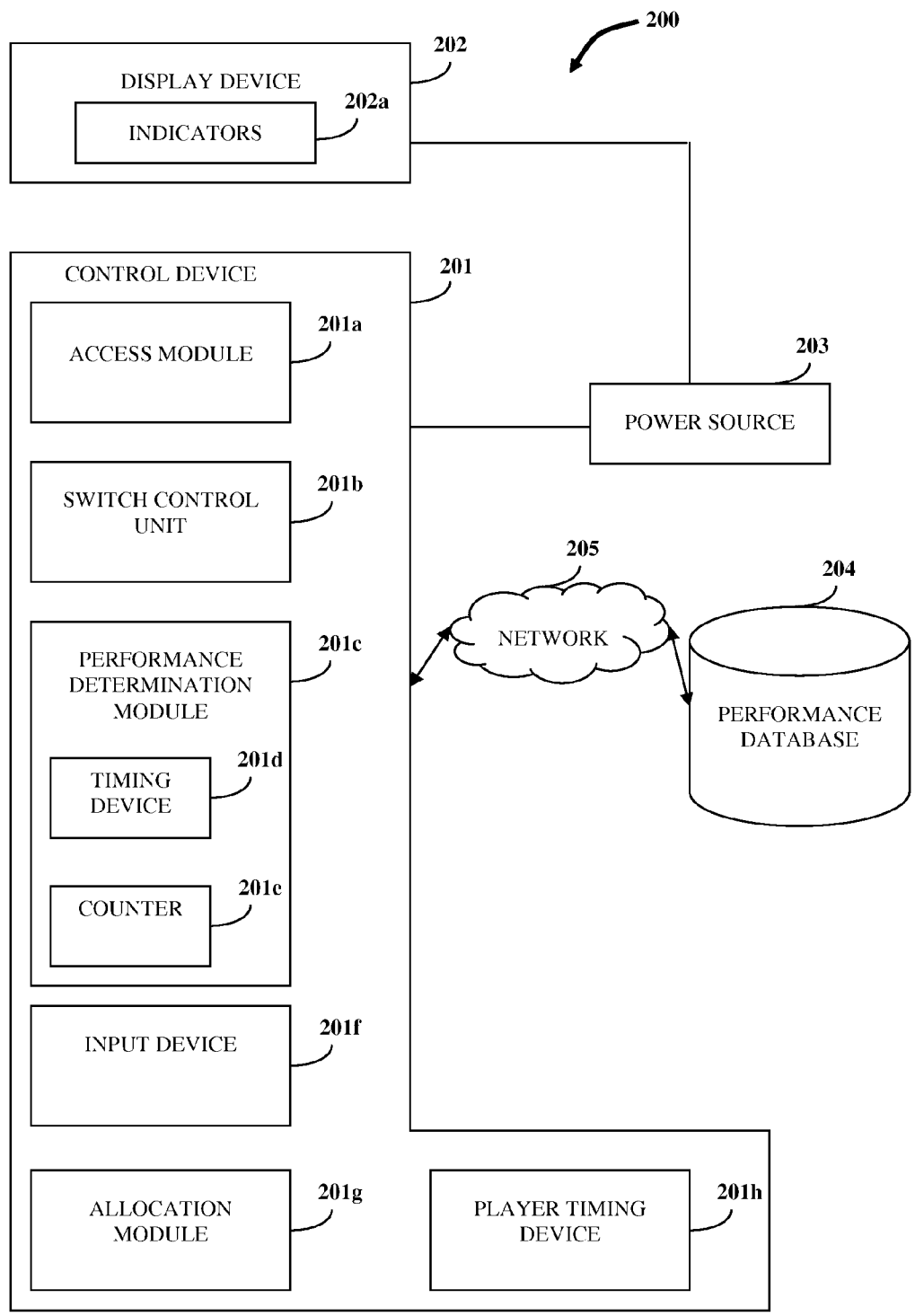
FIGS. 2A-2B illustrate a system for signaling requests for one or more services at a gaming table in a casino.
Figure 2B:
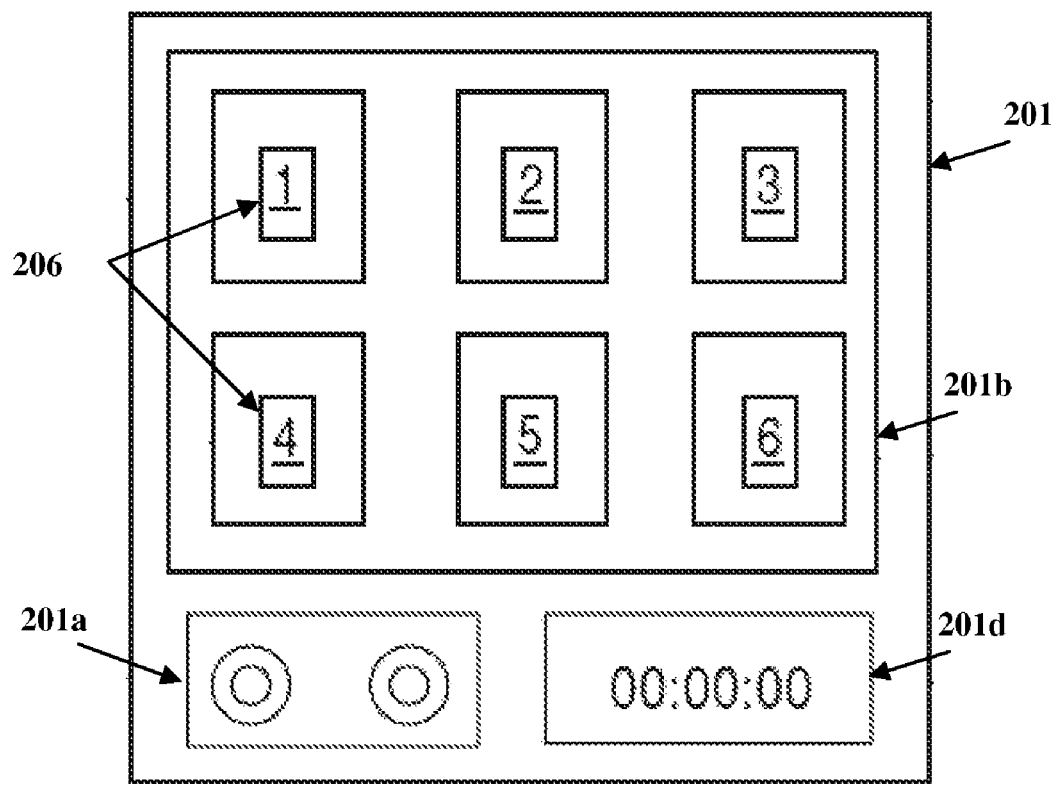

FIG. 1 illustrates a method of signaling requests for one or more services at a gaming table in a casino. While the detailed description refers to signaling requests for one or more services, determining performance of employees in a casino, and allocating resources in a casino in response to signals for the requests at a gaming table in the casino, the scope of the method and system 200 disclosed herein is not limited to a casino but may be extended to include other facilities, for example, a restaurant. A control device 201 is provided 101 on the gaming table. The components of the control device 201 are illustrated in FIGS. 2A-2B. The control device 201 comprises multiple switches 206, for example, push buttons as illustrated in FIG. 2B. The switches 206 are associated with one or more indicators 202a. The switches 206 of the control device 201 are activated to turn on one or more indicators 202a to display that a service is requested by the dealer or the player at the gaming table. The switches 206 are, for example, dealer-specific service switches, player-specific service switches, or a combination thereof. For example, a switch for a food request is a player-specific switch, and a switch for a security request is a dealer-specific switch. The switches 206 turn on the indicators 202a by wired communication, wireless communication, or a combination thereof to display that a service is requested at the gaming table. The indicators 202a are, for example, light emitting diodes (LEDs), conventional lamps, etc. that indicate the requests, for example, food requests, drink requests, security requests, chip requests, requests for presence of a floor manager, etc. from a dealer or a player. The request received is displayed, for example, in text or in code.

Figure 4:
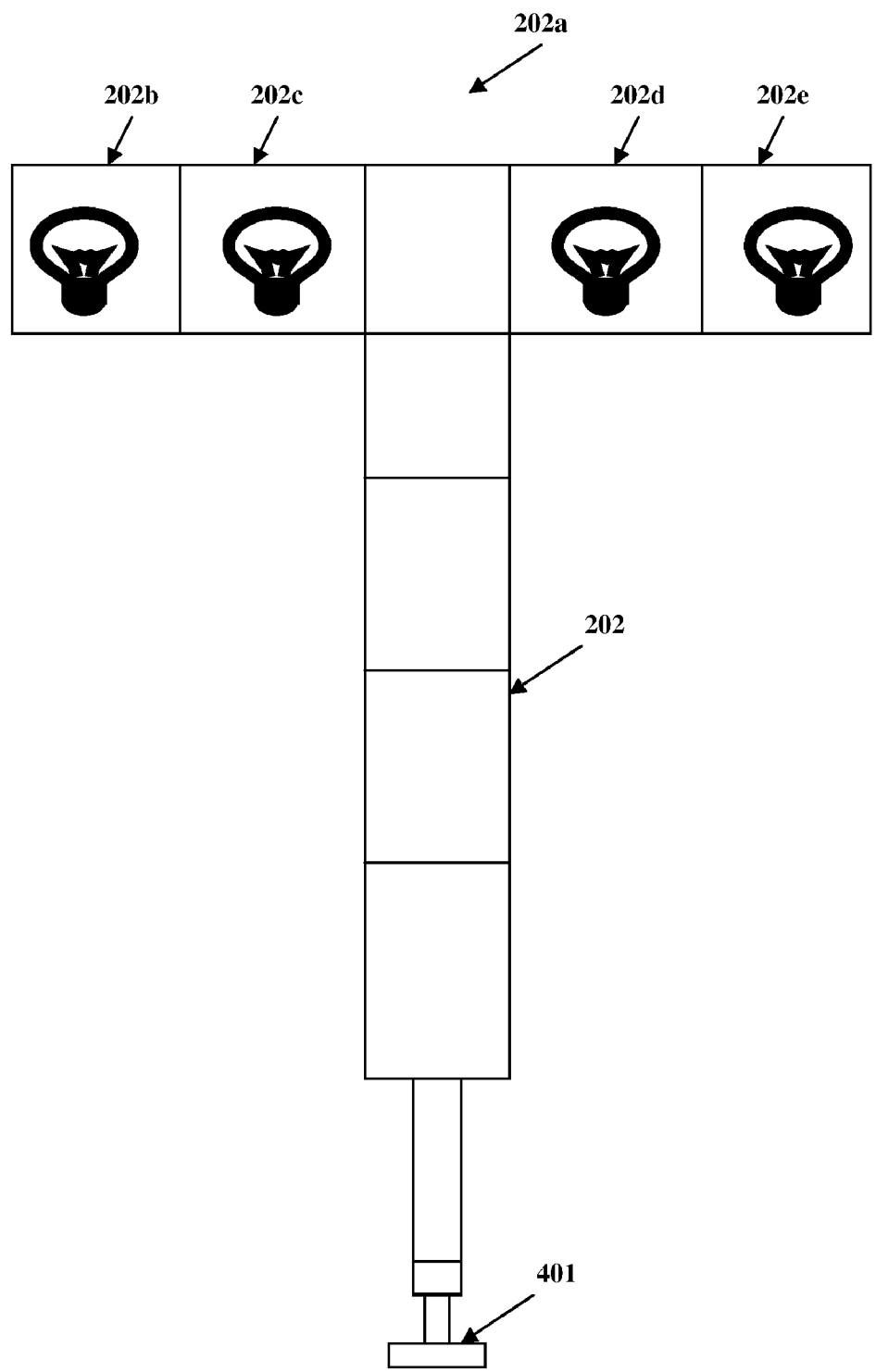
FIG. 4 exemplarily illustrates a display device housing indicators that signal requests for one or more services at a gaming table in a casino.

Each of the services are assigned 102 to one or more of the indicators 202a, for example indicators 202b, 202c, 202d, 202e, etc. as illustrated in FIG. 4. The indicators 202a are distinguished by, for example, different colors or different alphanumeric characters. For example, a green indicator, a yellow indicator, and a red indicator are distinguished by the colors green, yellow, and red respectively, or by the character "G", character "Y", and character "R" respectively. In an embodiment, the message on the indicators 202a is coded to be comprehensible only to the employees of the casino responsible for attending to the request for the service. A power source 203 is provided to drive the control device 201 and the indicators 202a. The power source 203 is, for example, an electric outlet. The control device 201 is provided with an access module 201a, for example, a set of locks or a card reader, for authorizing access to the control device 201. The dealer and a floor manager access the control device 201 using access devices, for example, authorization cards, keys, etc. provided to the dealer and the floor manager.

One or more players or a dealer at the gaming table may request various services, for example, food, drinks, security, chips, the presence of a floor manager, etc. When the dealer or the player wishes to signal requests, the dealer or the player activates 103 the switches 206 for turning on the indicators 202a based on service requirements of the dealer or the player. The turned on indicators 202a signal requests for the services.

In an embodiment of the method disclosed herein, performance of employees, for example, waiters, etc. of the casino that provide services to the player or the dealer, is determined. The performance determination is, for example, carried out by measuring the time taken by the employees to attend to the requests for the services, by counting number of requests attended to by each of the employees, etc.

In another embodiment of the method disclosed herein, employees of the casino are allocated in response to one or more signals for requests for services at the gaming table in the casino in real time. In this embodiment, the dealer activates one of the switches 206 to activate a player timing device 201h on the control device 201. The player timing device 201h limits the time allowed to a player to continue betting or to withdraw from the game at the gaming table. The player timing device 201h automatically turn offs when the time taken reaches a preset time. The preset time is the maximum time allowed for the player to continue playing or to withdraw from that game at the casino table. When the measured time reaches the preset time, one of the indicators 202a is turned on to inform the players of the time limit. Providing a preset time for the players to either continue playing or withdrawing from that game allows the dealer to deal more hands at the gaming table, thereby increasing the income at the gaming table in the casino in a shorter period of time.

Consider, for example, when a game is being played at the gaming table, the dealer activates a switch to activate the player timing device 201h. The player timing device 201h times the players when asked for calling or passing on a bet. The player timing device 201h automatically turns off when the time taken reaches the preset time, for example, 1 minute. When the measured time reaches 1 minute, an indicator, for example, 202b, 202c, 202d or 202e, etc. is turned on to inform the player of the elapsed time limit. The dealer cannot give one player more time than another player at the gaming table. This embodiment limits the time the player has to decide on whether to call or pass a bet. This embodiment saves time for the casino to get more hands dealt, thereby increasing the income of the casino in a shorter period of time.

FIG. 2A illustrates a system 200 for signaling requests for one or more services at a gaming table in a casino. The system 200 disclosed herein comprises a control device 201 provided on the gaming table, indicators 202a housed in a display device 202 and a power source 203. The control device 201 comprises a switch control unit 201b comprising multiple switches 206, an access module 201a, a performance determination module 201c, an input device 201f, and an allocation module 201g as illustrated in FIG. 2B. The switches 206 are associated with one or more indicators 202a, for example, indicators 202b, 202c, 202d, 202e, etc. as illustrated in FIG. 4. The switches 206 turn on the indicators 202a by wired communication, wireless communication, or a combination thereof. The switches 206 are, for example, dealer-specific service switches, player-specific service switches, or a combination thereof as explained in the detailed description of FIG. 1. Each service that a player or dealer may request is assigned to an indicator, for example, 202b, 202c, 202d or 202e, etc. housed in the display device 202. The indicators 202a are distinguished by, for example, different colors or different alphanumeric characters.

The switch control unit 201b enables the a player or a dealer to activate the switches 206 for turning on the indicators 202a housed in the display device 202 based on service requirements of the dealer or the player. The turned on indicators 202a signal the requests for the services.

The switches 206 are electrical components capable of breaking an electrical circuit, diverting current flow paths, and facilitating the flow of current through a part of the electrical circuit. The switches 206 are manually operated to alternate between at least a pair of electrical contacts. Each pair of contacts is operable in either an "on" state or an "off" state. The "on" state indicates that the contacts are in electrical contact with each other and current flows between the contacts. The "off" state indicates that the contacts are electrically separated and current is not flowing between them. Activation of the switches 206 to the "on" state turns on the indicators 202a.

The indicators 202a, for example, indicators 202b, 202c, 202d, 202e, etc. are, light emitting diodes (LED) or conventional incandescent lights. An incandescent light contains a central filament made of a metal with a high melting point such as tungsten. The filament heats up to high temperatures because of its high melting point and the heat produced is radiated in the form of light. The external bulb encasing the filament is suitably adapted to produce light of different colors, i.e., the glass bulb is of different colors to produce similar lights. The LED is an electronic source of emission. LEDs emit light across a range of electromagnetic radiation, for example, visible radiation, ultraviolet radiation, and infrared radiation. LEDs are based on semiconductor diodes. The switching on of an LED facilitates the recombination of electrons with holes and the resultant energy is emitted as light. The energy gap of the semiconductor used in the LED determines the color of light emitted.

The access module 201a for example, a card reader or a set of locks authorizes access to the control device 201. Access devices, for example, authorization cards or keys are provided to authorized employees of the casino, for example, a floor manager and the dealer to access the control device 201. Unauthorized use of the system 200 is precluded by restricting access to the control device 201. In an embodiment, the access module 201a is, for example, an alphanumeric keypad, functioning either alone or in conjunction with a card scanner. In this embodiment, the access device is, for example, a password known only to authorized employees of the casino, for example, the dealer and the floor manager. The dealer and the floor manager enter the password to the access module 201a to access the control device 201. The card scanner scans the identification card of an employee that attends to a request for a service made by a player or the dealer. Alternatively the employee enters an employee code by means of the alphanumeric keypad provided on the control device 201.

The performance determination module 201c determines the performance of the employees of the casino that attend to the service requests from the dealer or the player. The performance determination module 201c comprises a timing device 201d and a counter 201e. Upon activation of a switch to turn on an indicator, for example, 202b, 202c, 202d or 202e, etc. to signal a request for one of the services by the dealer or the player, the control device 201 detects a change in the status of the switch and activates the timing device 201d in the performance determination module 201c. The timing device 201d measures the time taken by the employees to attend to the requests for the services by the dealer or the player at the gaming tables. Once the control device 201 detects that the switch is deactivated to turn off the indicator, for example, 202b, 202c, 202d or 202e, etc. indicating that the request has been attended to by one of the employees, the timing device 201d stops and the duration of the indicator, for example, 202b, 202c, 202d or 202e, etc. remaining turned on is measured. The income earned by each table in a casino depends on the number of hands the dealer deals in a given time. The drops earned at the gaming table are inversely proportionate to the time the dealer has to spend in attending to the requests of the players. A gauge of the performance of employees of the casino, for example, waiters, bartenders, etc. is the time taken by the employees to attend to requests for the services. The counter 201e counts the number of requests attended to by each of the employees.

The system 200 disclosed herein further comprises a performance database 204. The performance database 204 communicates with the control device 201 via a network 205. The performance database 204 stores information on the response of the employees attending to the service requests of the players and the dealer in real time. For example, the performance database 204 stores time of activation of the switches 206, time duration of indicators 202a remaining on, the time when the indicators 202a are switched off, the type of requests, information on the employee that attended to the request, etc. The counter 201e determines the number of requests attended to by each of the employees during any period of time using the performance database 204. The performance database 204 stores the performance data of the employees of the casino. The performance data comprises time taken by an employee to attend to requests for services, the number of requests attended to by each of the employees, etc. The performance data is measured by the performance determination module 201c and updated on the performance database 204 over the network 205, for example, a wireless network. The performance data of the employees is reviewed by the managers of each of the services to determine the performance of each of the employees of the casino.

Figure 6:
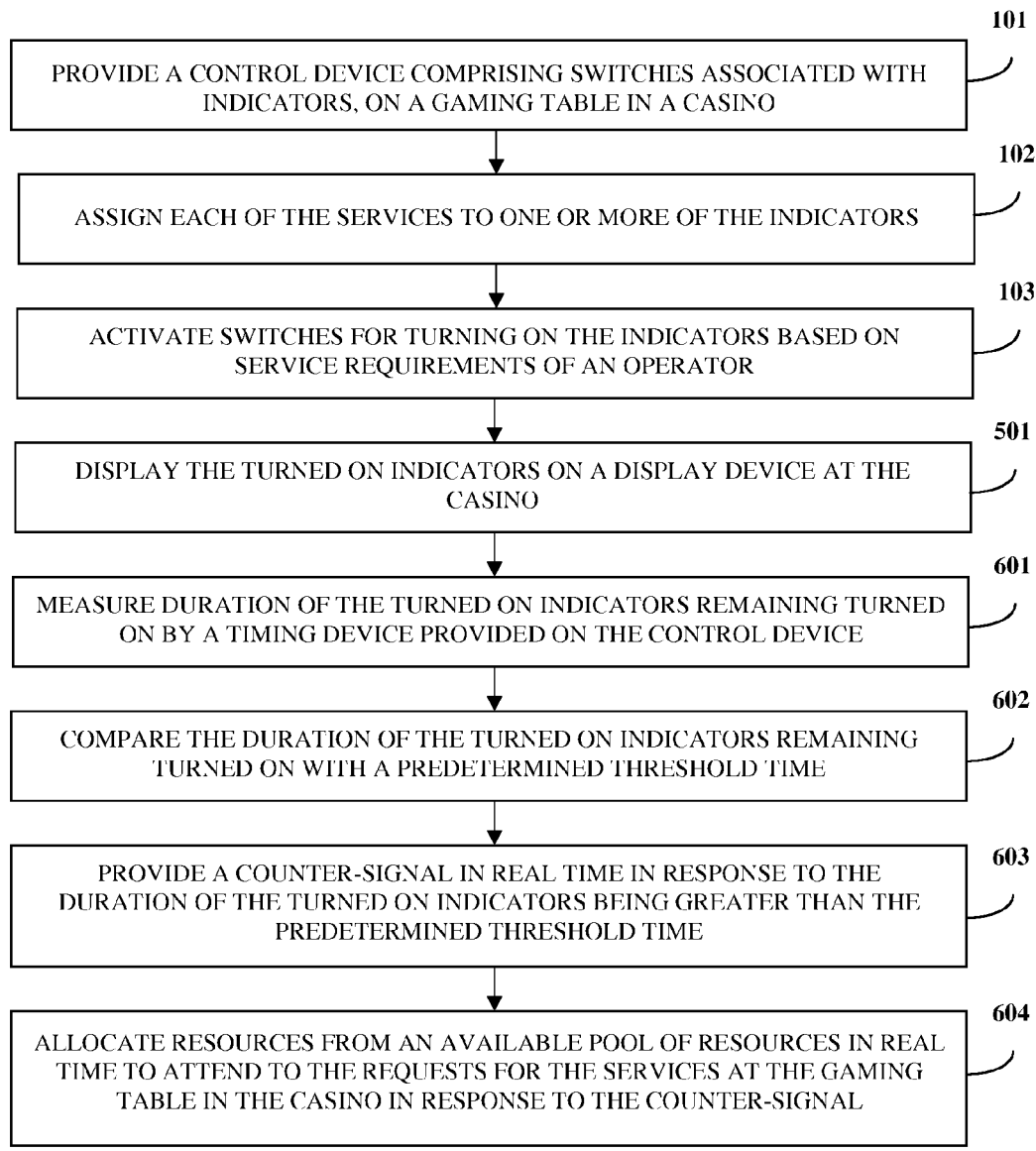
FIG. 6 illustrates a computer implemented method of allocating resources in a casino in response to one or more signals for requests for one or more services at a gaming table in a casino in real time.

The allocation module 201g allocates resources, for example, employees of the casino in response to the signals for the requests for the services at the gaming table as explained in the detailed description of FIG. 6.

The system 200 disclosed herein further comprises a player timing device 201h for limiting the time allowed to a player to continue betting or to withdraw from the game at the gaming table as explained in the detailed description of FIG. 1

The power source 203 drives the indicators 202a housed in the display device 202 and the control device 201. The power source 203 is, for example, an electric outlet supplying alternating current (AC) power. The electric outlet is provided in the vicinity of the gaming table, for example, under the gaming table. The control device 201 and the indicators 202a to be driven are plugged into the power source 203.

The control device 201 is a programmable computing device with a processor that employs an operating system for performing multiple tasks. The operating system manages security of network connections, the control device 201, peripheral devices, for example, the access module 201a, the player timing device 201h, etc. connected to the control device 201. The operating system employed by the control device 201 recognizes inputs of the dealer or the employees by means of an input device 201f, for example, an alphanumeric keypad, and stores the input data in the memory of the control device 201. Different programs are executed by the operating system with the help of the processor, for example, a central processing unit (CPU). The operating system monitors the use of the processor. The control device 201 is programmed to monitor the status of the switches 206 on the switch control unit 201b, and consequently the indicators 202a. The control device 201 further controls the operations of the access module 201a, the performance determination module 201c, and the allocation module 201g. The switch control unit 201b comprises electronic switches 206 to turn on the indicators 202a, when activated, in response to a request made for a service, by the dealer or a player.

In an embodiment, the switches 206 are implemented in a matrix format on a programmable logic circuit. The matrix format of the switches 206 has vertical and horizontal lines which intersect at certain junctions. These junctions are the switches 206 at an electronic level. A junction is closed when current flows through both the horizontal line and the vertical line. The horizontal and vertical lines are electrically in contact when the switches 206 are activated. The horizontal lines are kept active throughout. The vertical lines are electrically dead when the switches 206 are not activated. Activation of one of the switches 206 brings the corresponding horizontal and vertical lines in electrical contact and the control device 201 is able to precisely locate the switch that has been activated. The control device 201 is further programmed to associate an activated switch to the service requested by activating that particular switch.

The processor employed in the control device 201 executes requests and instructions. Instructions for coordinating working of the modules of the control device 201 are retrieved by the processor from the memory in the form of signals. The instructions fetched by the processor from the memory after being processed are decoded. After processing and decoding, the instructions are executed. The processor comprises an arithmetic and logic unit for performing mathematical and logical operations on the instructions.

The processor controls the operations of measuring, recording, and analyzing parameters associated with response of the employees to the service requests, measuring time taken by the employees to attend to the service requests, determining number of requests attended to by each of the employees, etc.

The instructions enabling the measuring of response times of the employees of the casino to requests for the services are fetched from the memory in response to activation of one of the switches 206 to turn on one of the indicators 202a associated with the switch. The fetched instructions are decoded and the processor instructs a timing device 201d to initiate the measuring of the response times of the employees. The measured time is retrieved from the timing device 201d that the processor is in communication with and is compared to a threshold time that is preset on the control device 201, by means of a compare instruction. If the measured response time is greater than the threshold time, the processor executes instructions to create an alert in the form of, for example, an electronic flag, and updates the status of the service request on the performance database 204 via the network 205. The performance database 204 is centrally accessible to the managers of each of the services. On observing the electronic flag, the managers for the service which has been requested, allocate employees of the casino from one section of the casino to another section where the gaming table is located, depending on the availability of employees to attend to the service requests. Alternatively, the processor executes instructions to alert the respective service manager by means of, for example, an alarm, a short message service (SMS) message, display of an alerting indicator, etc. The processor is linked to the outside of the processing environment by means of an input-output interface (I/O). The processor also instructs the counter 201e of the control device 201 to count the number of requests attended to by each of the employees of the casino.

The processor also instructs the player timing device 201h to measure a preset elapsed time at the expiration of which one of the indicators 202a is turned on to inform the player to continue playing a game at the gaming table or to withdraw from the game.

Figure 3:
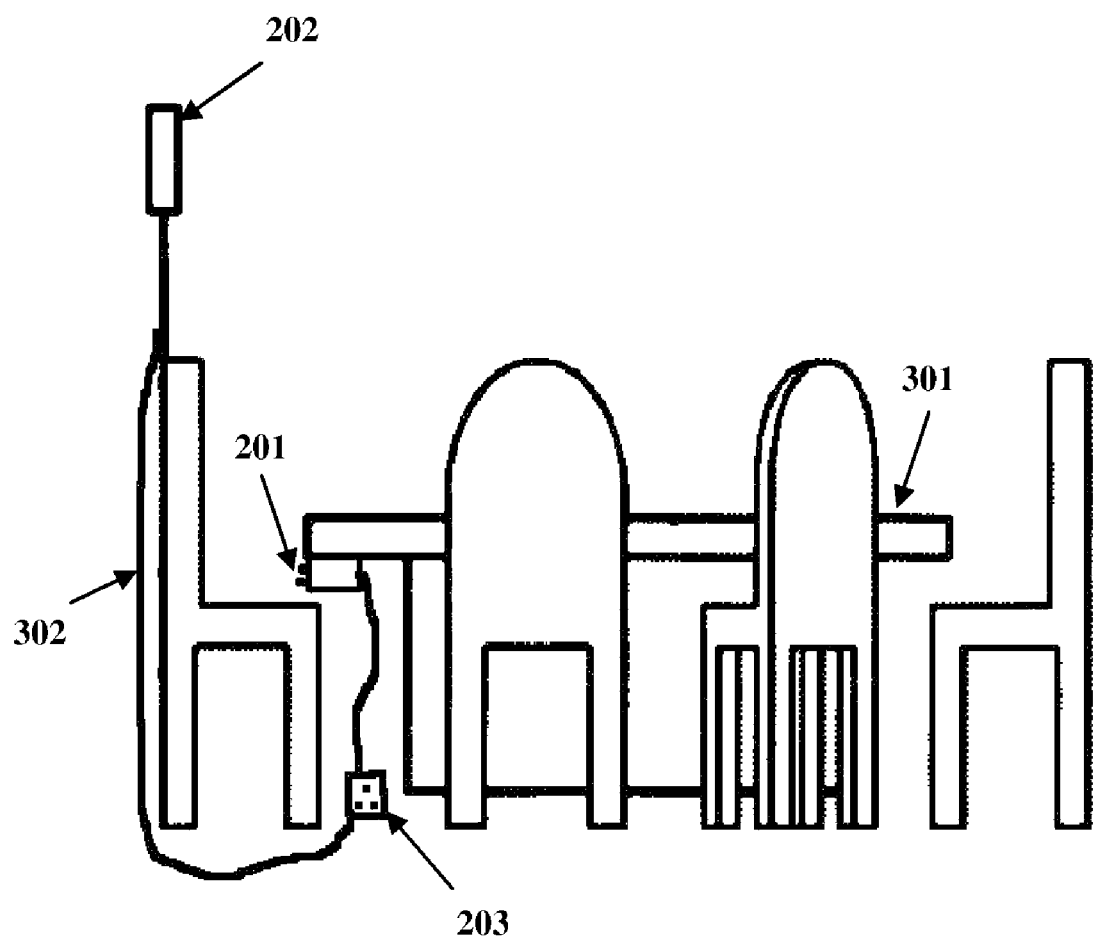
FIG. 3 exemplarily illustrates the system for signaling requests for one or more services incorporated on a gaming table in a casino.

FIG. 3 exemplarily illustrates the system 200 for signaling requests for one or more services incorporated on a gaming table 301 in the casino. FIG. 3 further illustrates a power source 203 used for driving the control device 201 explained in the detailed descriptions of FIG. 1 and FIGS. 2A-2B. A connecting means 302, for example, an electric cable is used for connecting the indicators 202a and the control device 201 to the power source 203. The control device 201 and indicators 202a are powered by the power source 203, for example, an electric outlet supplying AC power. Consider an example where a dealer D and player A, player B, and player C are seated around the gaming table 301, for example, a blackjack table or a poker table. Consider multiple switches 206, for example, switch 1, switch 2, switch 3, switch 4, and switch 5 of the control device 201 are associated with the color indicators 202a green, blue, red, yellow, and purple respectively housed in a display device 202. Switch 1 operates the green indicator, switch 2 operates the blue indicator, switch 3 operates the red indicator, switch 4 operates the yellow indicator, and switch 5 operates the purple indicator. The display device 202 is located at a height for prominently displaying the indicators 202a.

The indicators 202a are assigned to one or more of the services. For example, the green indicator is assigned to food requests, the blue indicator is assigned to drink requests, the red indicator is assigned to security requests, the yellow indicator is assigned to chip requests, and the purple indicator is assigned to requests for the presence of a floor manager. The dealer and the player activate the dealer-specific switches and the player-specific switches respectively based on the dealer's and player's service requirements. The dealer operates the dealer-specific switches to request for services exclusive to the dealer. In this example, the dealer-specific switches are switch 3, switch 4, and switch 5. The player operates the player-specific switches to request for services exclusive to the player. In this example, the player-specific switches are switch 1 and switch 2.

Consider an example where one of the players or the dealer requests for one of the services. For example, player A wishes to request for food and player B and player C wish to request for drinks. The player A activates player-specific switch 1 on the switch control unit 201b on the control device 201 to turn on the green indicator to signal a request for food to be brought to the gaming table 301. Similarly, the player B and player C activates player-specific switch 2 on the switch control unit 201b on the control device 201 to turn on the blue indicator to signal a request for drinks to be brought to the gaming table 301.

Similarly, dealer D activates dealer-specific switch 3 and dealer-specific switch 4 to turn on the red indicator and the yellow indicator respectively on the display device 202 to signal a request for security and chips respectively. If dealer D wishes to signal a request for presence of the floor manager, for example, to resolve a dispute, dealer D activates dealer-specific switch 5 on the switch control unit 201b to turn on the purple indicator to signal a request for the floor manager to be present at the gaming table 301.

Additionally, an indicator, for example, 202b, 202c, 202d or 202e, etc. is associated with switch 6 to signal an availability of a seat at the gaming table 301. The indicator, for example, 202b, 202c, 202d or 202e, etc. is assigned with, for example, a pink color or a flashing pattern, to signal the availability of a seat. In this example, switch 6 is a dealer-specific switch. The dealer turns on the seat availability indicator by activating dealer-specific switch 6, when a seat is available at the gaming table 301. An interested player sees the indicator, for example, 202b, 202c, 202d or 202e, etc. flashing continuously or displaying a pink color. The flashing indicator or the pink indicator indicates to the player that a seat is available at the gaming table 301. The player then takes the available seat at the gaming table 301.

The indicators 202a are switched on to request for a service and switched off when the request has been attended to by an employee of the casino. The time taken to attend to the requests is measured by a timing device 201d in the performance determination module 201c. Due to the ease of requesting for services, players order more food and drinks, thereby increasing the income of each service, saving time for the players and allowing the dealer to deal more hands in a period of time.

The system 200 for signaling requests for one or more services described above is also adapted to suit the needs of a service request in a facility, for example, a restaurant. The patrons activate the switches 206 on a control device 201 provided on a table they are seated at in the restaurant, to turn on indicators 202a to request for services from, for example, a waiter, or a manager. The services are assigned to indicators 202a to suit the convenience of the restaurant. For example, a blue indicator, when turned on, signals a request for a waiter to attend to a service, for example, bring a menu, and a green indicator when turned on, signals a request for a check to be brought to the table.

FIG. 4 exemplarily illustrates a display device 202 housing indicators 202a, for example, indicators 202b, 202c, 202d, 202e, etc. that signal requests for one or more services at a gaming table 301 in the casino. In FIG. 4, the indicators 202a are LED bulbs. The indicators 202a are distinguished by unique coloring or alphanumeric markings. The display device 202 is located at a convenient height for prominent display of the indicators 202a housed within, when the indicators 202a are turned on. The display device 202 is, for example, incorporated on the gaming table 301. An adjustable clamp 401 securely attaches the display device 202 to a vertically elevated structure.

Figure 5:
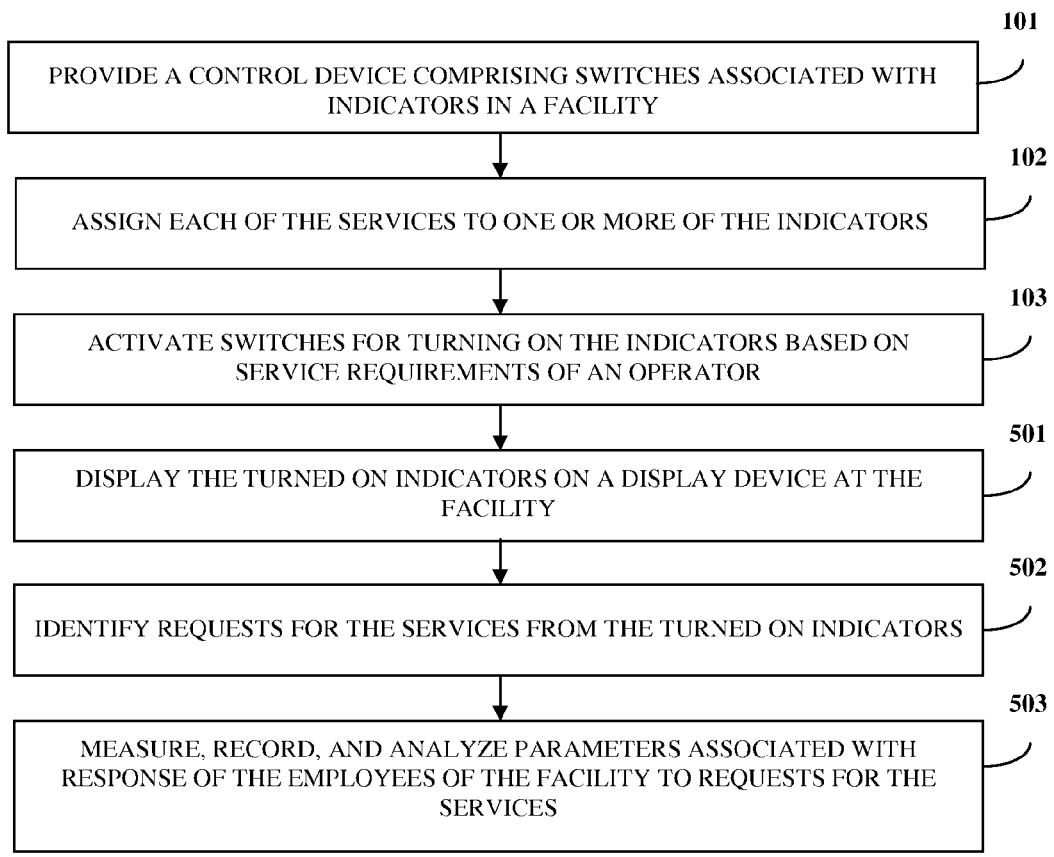
FIG. 5 illustrates a computer implemented method of determining performance of employees of a facility.

FIG. 5 illustrates a computer implemented method of determining performance of employees of a facility, for example, a casino. A control device 201 is provided 101 at the facility as explained in the detailed description of FIG. 1 and FIGS. 2A-2B. Each of the services provided by the facility is assigned 102 to one or more indicators 202a. An operator, for example, a player or a dealer, activates 103 the switches 206 at the facility for turning on the indicators 202a based on service requirements of the operator or one or more operators at the facility. The turned on indicators 202a are displayed 501 on a display device 202 at the gaming table 301. The indicators 202a remain turned on until the request for the service has been attended to by an employee of the casino. The requests for the services are indicated by indicators 202a which are distinguished, for example, by different colors, different alphanumeric characters or by a code comprehensible only to the employees of the casino responsible for attending to the request for the service. The employees identify 502 the requests for the services from the turned on indicators 202a. Parameters associated with response of the employees to the identified requests for the services are measured, recorded, and analyzed 503 to determine the performance of the employees. One of the parameters is, for example, time taken by the employees to attend to the requests. The time taken is measured using the timing device 201d. Another parameter is, for example, number of requests attended to by an employee in a certain period of time, for example in an eight hour shift. A counter 201e counts the number of requests attended to by an employee of the casino.

Each of the services is managed by a manager. Each manager observes the indicators 202a signaling requests for services the managers manage. Based on the duration of time the indicators 202a remain switched on, the manager decides if additional employees are required to attend to the requests, or to find employees that are supposed to attend to that service. The manager then assigns additional employees to attend to the requests for the service if it is observed that the indicator, for example, 202b, 202c, 202d or 202e, etc. assigned to the service has remained turned on for an above average period of time, i.e. the request has not been attended to. The system 200 thus enables managers of services provided in a casino to monitor the performance of the employees and helps the managers formulate their staffing solutions.

Consider an example for determining the performance of employees of the casino. A player, for example, player A, at a gaming table 301 in a casino wishes to order some food and activates player-specific switch 1 to turn on a green indicator to signal a food request. A timing device 201d on the performance determination module 201c is activated when the green indicator is turned on. The green indicator remains on until an employee, for example, a waiter with employee code W1, attends to the food request. Once the food request has been attended to by the waiter with employee code W1, the green indicator is switched off. The duration that the green indicator was on is measured by the timing device 201d and entered in the performance database 204. The control device 201 prompts the employee to enter the employee code when the request for a service has been attended to by the employee. The employee code is entered via the input device 201f, for example, an alphanumeric keypad or a scanner to scan an identification (ID) card of the waiter. In this example, the waiter enters his employee code W1 by scanning the ID W1 of the waiter.

The counter 201e is incremented by one each time a request has been attend to by the employee to indicate the number of requests the employee has attended to. The performance determination module 201c assembles the timing data, the employee code, and the number of requests attended to by the employee and updates this data on the performance database 204 via the network 205. The performance data of the employees on the performance database 204 is reviewed by managers of the respective services and the performance of the employees is determined based on parameters such as time taken to attend to requests, number of requests attended to, etc.

FIG. 6 illustrates a computer implemented method of allocating resources in a casino in response to one or more signals for requests for one or more services at a gaming table 301 in a casino in real time. The resources are, for example, employees of the casino attending to the requests for services. A control device 201 comprising multiple switches 206 associated with multiple indicators 202a is provided 101 on a gaming table 301. Each of the services is assigned 102 to one or more of the indicators 202a. If an operator, for example, a player or a dealer, at the gaming table 301 wishes to request for one of the services, the operator activates 103 one of the switches 206 to turn on the indicator, for example, 202b, 202c, 202d or 202e, etc. assigned to the requested service. The turned on indicators 202a are displayed 501 on a display device 202. The duration of the turned on indicators 202a remaining turned on is measured 601 using a timing device 201d provided on the control device 201.

The computer system of the control device 201 on the gaming table 301 constantly compares the duration of the turned on indicators 202a remaining turned on with the predetermined threshold time 602 and provides 603 a counter-signal, for example, an electronic flag, in real time in response to the duration of the turned on indicators 202a being greater than the predetermined threshold time. The control device 201 updates the electronic flag on the performance database 204 in real time. The performance data is centrally accessible to the managers of each of the services offered in the casino. A manager of the service for which the request is made, is alerted by the electronic flag on the performance database 204. The manager then allocates 604 the employees required to attend to the request from the operator for the service from among the available employees. Depending on the performance data stored on the performance database 204, the managers get a better idea of which sections of the casino have thinner service traffic, which sections of the casinos require a reallocation of staff, etc.

In the computer implemented method explained in the detailed description of FIG. 6, the computer system on the control device 201 picks up the delay in attending to a service request at the gaming table 301, and sends an alert to a service manager via, for example, an alarm, a short message service (SMS) message, display of an alerting indicator, etc. The manager may then transfer an employee of the casino in real time from one gaming table 301 to another or from one section of the casino to another.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the performance database 204, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of increasing the number of hands dealt within a given timeframe at a gaming table in a casino, comprising:
   providing a control device comprising:
      a switch and an alarm;
      a processor configured to sound said alarm in response to activation of said switch; and
      a player timing device for measuring a preset time from activation of said switch and causing said processor to sound said alarm on expiration of said preset time;
   activating said switch by a dealer for causing said processor to turn on said player timing device, said player timing device counting said preset time, said preset time providing an indication of a time limit for a player at said gaming table to perform one or more of a plurality of activities associated with said game; and
   sounding said alarm after expiration of said preset time; whereby creating said time limit for said player to perform said activity increases the number of hands dealt within said given timeframe.

2. The method of claim 1, wherein said control device further comprises a plurality of switches associated with a plurality of indicators, wherein said dealer signals requests for one or more services by activating one or more of said switches to turn on one or more of said indicators, and wherein the requests for the services comprise food requests, drink requests, security requests, requests for playing chips, and requests for presence of a floor manager.

3. The method of claim 2, further comprising the step of providing a power source to drive the control device and the indicators.

4. The method of claim 2 further comprising the step of determining performance of employees attending to the requests for the services by measuring time taken by said employees to attend to the requests for the services and by counting number of requests attended to by each of the employees using the control device.

5. The method of claim 2, wherein each of the indicators is of a different color.

6. The method of claim 2, wherein each of the indicators displays a different alphanumeric character.

7. The method of claim 1, further comprising the step of providing an access module for authorizing access to the control device, wherein the dealer and a floor manager access the control device using access devices provided to the dealer and said floor manager.

8. The method of claim 1, wherein the switches are dealer-specific switches.

9. The method of claim 2, further comprising the step of allocating employees of said casino in response to said signals for the requests for the services at the gaming table.

10. The method of claim 1, wherein said preset time is one minute.

11. A system for increasing the number of hands dealt within a given timeframe at a gaming table in a casino, comprising: a control device, comprising: a switch and an alarm; a processor configured to sound said alarm in response to activation of said switch; and a player timing device for measuring a preset time from activation of said switch and causing said processor to sound said alarm on expiration of said preset time; activating said switch by a dealer for causing said processor to turn on said player timing device, said player timing device counting said preset time, said preset time providing an indication of a time limit for a player at said gaming table to perform one or more of a plurality of activities associated with said game; and sounding said alarm after expiration of said preset time; whereby creating said time limit for said player to perform said activity increases the number of hands dealt within said given timeframe.

12. The system of claim 11, wherein said control device further comprises a plurality of switches and a plurality of indicators associated with said switches, wherein said indicators are housed in a display device, and wherein a dealer signals requests for one or more services by activating one or more of said switches to turn on one or more of said indicators.

13. The system of claim 12, further comprising a power source for driving the control device and the indicators.

14. The system of claim 12, wherein the switches are dealer-specific switches.

15. The system of claim 12, wherein the control device further comprises a performance determination module for determining performance of employees of said casino attending to the requests for the services, wherein said performance determination module comprises a timing device for measuring time taken by said employees to attend to the requests for the services, and a counter for counting number of requests attended to by each of the employees.

16. The system of claim 15, further comprising a performance database for storing information on said response of employees attending to the requests for the services in real time.

17. The system of claim 12, wherein the control device further comprises an allocation module for allocating employees of said casino in response to said signals for the requests for the services at the gaming table.

18. The system of claim 11, wherein the control device comprises an access module for authorizing access to the control device, wherein the dealer and a floor manager access the control device using access devices provided to the dealer and said floor manager.

19. The system of claim 11, wherein said preset time is one minute.

* * * * *